A. FISCHER.
SOUND BOX FOR TALKING MACHINES.
APPLICATION FILED JULY 1, 1909.
989,139.
Patented Apr. 11, 1911.
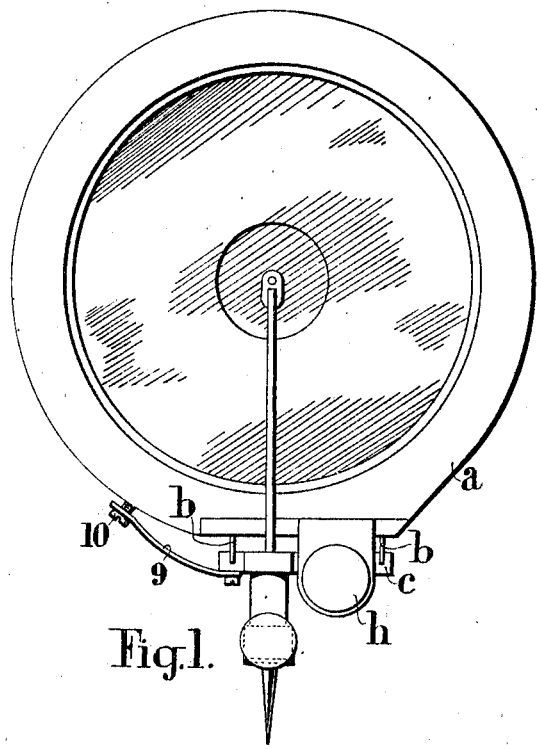
Fig.1.
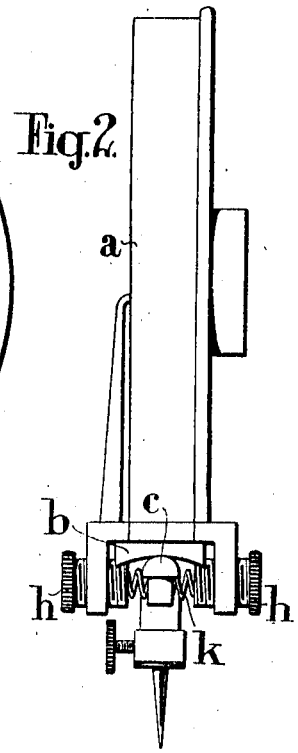
Fig.2.
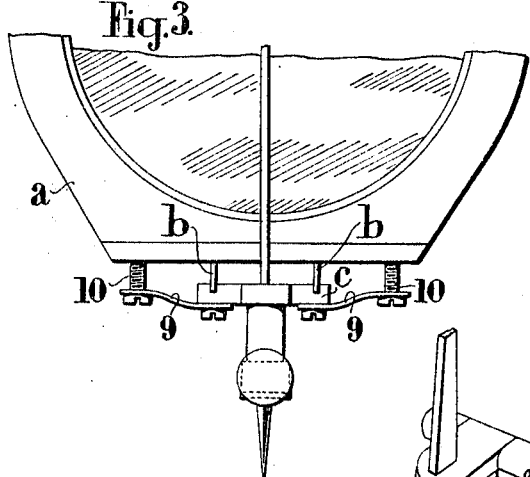
Fig.3.
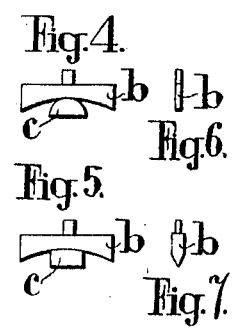
Fig.4.
Fig.6.
Fig.5.
Fig.7.
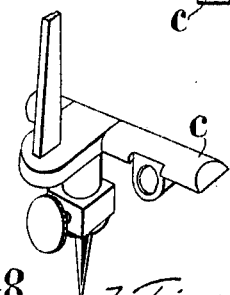
Fig.8.
Inventor
Alex Fischer

UNITED STATES PATENT OFFICE.

ALEX FISCHER, OF KENSINGTON, LONDON, ENGLAND.

SOUND-BOX FOR TALKING-MACHINES.

989,139.   Specification of Letters Patent.   Patented Apr. 11, 1911.

Application filed July 1, 1909. Serial No. 505,472.

*To all whom it may concern:*

Be it known that I, ALEX FISCHER, a subject of the King of England, residing at 8 Maclise road, Kensington, in the county of London, England, have invented certain new and useful Improvements in Sound-Boxes for Talking-Machines; and I do hereby declare the following to be a full, clear, and exact description of the invention, such as will enable others skilled in the art to which it appertains to make and use the same.

This invention relates to bearings for mounting a stylus on sound boxes of talking machines, and has for its object the improvement of the bearings and coacting parts described in my former Patent Number 904,523, November 24, 1908, sound boxes for talking machines.

To these ends the invention consists in the details of construction and novel combinations of parts more fully hereinafter disclosed and particularly pointed out in the claim.

In my former patent above, the spindle $c$ is mounted in brackets $b$ provided with bearing surfaces concentric with the curved portion of said spindle $c$ and the centers of which lie within said spindle. In the present improvement, however, I substitute for these other curved surfaces with their centers outside of the spindle $c$, as will appear below.

Referring to the accompanying drawings forming a part of this specification in which like letters refer to like parts in all the views:—

Figure 1, is a front elevational view of a sound box with my improvement applied thereto: Fig. 2 is a side elevational view of the parts shown in Fig. 1; Fig. 3, shows a modified form of construction according to the present invention; Figs. 4 to 7 show details of the bearings hereinafter referred to; and, Fig. 8, shows a perspective view of the stylus and associated parts.

$a$ is the shell of the sound box provided with guide bearings $b$. It will be observed from Figs. 1 to 7 that these bearings are of concave form, and are a small segment of a circle.

$c$ is the spindle bearing which, as in the patent above, may be circular or partly circular in cross section.

In Figs. 2 and 4 the radius of curvature of the spindle is smaller than the radius of curvature of the guide bearing surface $b$, while in Fig. 5 the radius of curvature of the spindle $c$ is the same as that of the guide bearing surface $b$, but in each case the center of the circle, of which the bearing surface $b$ is the circumference instead of falling within said spindle $c$, falls considerably outside the same.

$k$ shows spiral controlling springs and $h$ shows hollow nuts. 9 is a flat spring preferably attached by a screw to the side of the spindle $c$ opposite the bearing surface, the other end being slotted and having a screw 10 passing through such slot into the shell $a$ of the sound box.

Referring now to the form shown in Fig. 3, which is intended more especially for the construction of a cheaper sound box than that described, in this case the springs $k$ hollow nuts $h$ and brackets $g$ shown in Fig. 2 of the drawings of the patent above, are dispensed with, and in their place a second flat spring 9 is attached to the side of the spindle $c$ opposite its bearing surface as seen on the left of Fig. 3.

Referring to the details shown in Figs. 6 and 7 which are edge views of two forms of guide bearings $b$, the guide bearing shown in Fig. 6 is made of a thin plate, while the guide bearing in Fig. 7 is made with a beveled bearing also.

From the construction now disclosed, it will be evident since the centers of curvature of the bearings $b$ and $c$ fall outside of the spindle $c$, that not only will all the freedom of motion be permitted that is possessed by the corresponding structure of my patent above, but in addition to such motion the present structure enables the spindle $c$ to have a slight sidewise movement in the bearing $b$. In other words said spindle may, in a sense, be considered as constituting the fulcrum of a bent lever, one end of one arm of which terminates in the needle point and the end of the other arm of which is connected to the stylus bar. Further, the bearing $b$, therefore, enables the spindle $c$ constituting the fulcrum of this lever to be laterally shifted, and to move against the push of the springs and the pull of the diaphragm under the stresses imparted by the traveling record.

It is further evident that the structure in the patent above would be unsuitable to permit this lateral shifting of the fulcrum so long as the centers of curvature of the bearings lie with the spindle $c$. It is also evident, if the bearing surface of the part $b$ is made straight, too much play will be allowed the spindle $c$. In practice I have found a convenient length of radius for the curvature of the said bearing to be about equal to the length of the lever above, although, of course, this may be varied without destroying the beneficial effects of the invention.

What I claim is:—

In a talking machine, the combination of a casing; a diaphragm in said casing; a pair of concavely curved guide bearings rigid with said casing; a spindle provided with curved guide bearings adapted to contact with said first mentioned bearings, the center of curvature of each of said first mentioned bearings being located outside of said spindle, and the radius of curvature of said spindle being less than the radius of curvature of said first mentioned bearings; and a stylus bar attached to said diaphragm and spindle, substantially as described.

In testimony whereof, I affix my signature, in presence of two witnesses.

ALEX FISCHER.

Witnesses:
LILY SIMMONDS,
A. E. VIDAL.